(12) United States Patent
Liu et al.

(10) Patent No.: US 8,751,522 B2
(45) Date of Patent: Jun. 10, 2014

(54) SEARCH IMPROVEMENT USING HISTORIC CODE POINTS ASSOCIATED WITH CHARACTERS

(75) Inventors: Su Liu, Round Rock, TX (US); Robert K. Sloan, Pflugerville, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/445,327

(22) Filed: Apr. 12, 2012

(65) Prior Publication Data

US 2013/0275403 A1 Oct. 17, 2013

(51) Int. Cl.
*G06F 17/30* (2006.01)

(52) U.S. Cl.
USPC ............. 707/768; 707/706; 707/758; 700/11; 700/12; 700/14; 715/200

(58) Field of Classification Search
None
See application file for complete search history.

(56) References Cited

U.S. PATENT DOCUMENTS

| | | | |
|---|---|---|---|
| 6,055,365 A | 4/2000 | Tye | |
| 6,434,574 B1* | 8/2002 | Day et al. | 1/1 |
| 7,013,314 B2* | 3/2006 | Day et al. | 707/763 |
| 7,240,066 B2 | 7/2007 | Burchall et al. | |
| 7,278,100 B1* | 10/2007 | Ehrman | 715/264 |
| 7,408,729 B2* | 8/2008 | Brooks et al. | 360/39 |
| 7,982,637 B2* | 7/2011 | Joyce | 341/55 |
| 8,015,196 B2* | 9/2011 | Taranenko et al. | 707/758 |
| 8,458,227 B1* | 6/2013 | Brundage et al. | 707/804 |
| 2002/0194172 A1* | 12/2002 | Schreiber | 707/4 |
| 2003/0023579 A1* | 1/2003 | Day et al. | 707/1 |
| 2004/0044791 A1* | 3/2004 | Pouzzner | 709/245 |
| 2005/0049997 A1* | 3/2005 | Shipp | 707/1 |
| 2008/0079730 A1* | 4/2008 | Zhang et al. | 345/468 |
| 2008/0319990 A1* | 12/2008 | Taranenko et al. | 707/5 |
| 2009/0089332 A1* | 4/2009 | Harger et al. | 707/104.1 |
| 2009/0164455 A1* | 6/2009 | Weinberg et al. | 707/5 |
| 2012/0254210 A1* | 10/2012 | Dhulipala et al. | 707/758 |

OTHER PUBLICATIONS

"Google Search Appliance, Search Appliance Internationalization", http://code.google.com/apis/searchappliance/documentation/60/internationalization/internationalization.html#crawlableEncoding, posted Jun. 2009, retrieved Jan. 19, 2012, 7 pages.
, "Google Search Engine: UTF-8 and Searches in Chinese", http://people.cohums.ohio-state.edu/chan9/pubn/chan_google_rev.pdf, Journal of the Chinese Language Teachers Association, vol. 39:2, May 2004, pp. 123-132.
Liu, Su et al., "System and Method for Improved Font Substitution with Character Variant Replacement", USPTO U.S. Appl. No. 13/193,826, filed Jul. 29, 2011, 18 pages.

* cited by examiner

*Primary Examiner* — Hung Le
(74) *Attorney, Agent, or Firm* — Francis Lammes; Stephen J. Walder, Jr.; Libby Z. Toub

(57) ABSTRACT

A mechanism is provided for improving search results. A user query is analyzed to identify a set of characters in the user query and an encoding code point associated with each character. A determination is made as to whether any of the encoding code points exist within a historic code point table. Responsive to at least one encoding code point existing within the historic code point table, all code points associated with each identified encoding code point in the user query are retrieved from the historic code point table. A modified user query is then created that utilizes the encoding code points of the user query and the code points from the historic code point table. The modified user query is then executed.

18 Claims, 5 Drawing Sheets

| CHARACTER | CODE POINTS |
|---|---|
| 近 | U+E844, U+4723 |
| 脆 | U+E862, U+4D19 |
| 欻 | U+E85D, U+4D14 |
| 撲 | U+E84F, U+4986 |
| 瑞 | U+E84E, U+4985 |

FIG. 4

SEARCH IMPROVEMENT USING HISTORIC CODE POINTS ASSOCIATED WITH CHARACTERS

BACKGROUND

The present application relates generally to an improved data processing apparatus and method and more specifically to mechanisms for improvement of searches using historic code points associated with characters.

Search engines provide a way for users to find information pertaining to a specified set of words, usually referred to as a query string. When a user enters a query string into a search engine, the search engine examines an associated index and provides a listing of best-matching data according to predetermined criteria, usually with a short summary containing a title of a document and sometimes parts of the text associated with the best-matching data. The associated index is built from the information stored with the data and the method by which the information is indexed. Most search engines support the use of the Boolean operators AND, OR and NOT to further specify the search query. Boolean operators are for literal searches that allow the user to refine and extend the terms of the search. The search engine looks for the words or phrases exactly as entered.

However, conventional search engines make an assumption that each character in a query string has a unique code point for a given encoding, and thus, each query string would have a unique set of code points. In character encoding terminology, a code point or code position is any of a set of numerical values that make up a code space or code page. For example, American Standard Code for Information Interchange (ASCII) comprises 128 code points in the range 0hex to 7Fhex, extended ASCII comprises 256 code points in the range 0hex to FFhex, and Unicode® comprises 1,114,112 code points in the range 0hex to 10FFFFhex. The Unicode® code space is divided into seventeen planes (the basic multilingual plane and 16 supplementary planes), each with 65,536 ($=2^{16}$) code points. Thus the total size of the Unicode® code space is 17×65,536=1,114,112. One example of a mapping on character and code point is as follows: the word "cloud" is equivalent to "U+0063 U+006C U+006F U+0075 U+0064" in Unicode®.

The notion of a code point is used for abstraction, to distinguish both:
  the number from an encoding as a sequence of bits, and
  the abstract character from a particular graphical representation (glyph).
  This is because one may wish to make these distinctions:
  encode a particular code space in different ways, or
  display a character via different glyphs.

For Unicode®, the particular sequence of bits is called a code unit. For the UCS-4 encoding, characters/code points are encoded as 4-byte (octet) binary numbers (which is fixed-width and simple, but inefficient), while in the UTF-8 encoding, characters are encoded as 1- to 4-byte numbers (which is variable-width, hence more efficient but more complex, and backward-compatible with ASCII). Code points are normally assigned to abstract characters. An abstract character is not a graphical glyph but a unit of textual data. The precise appearance of the character depends on the font. However, code points may also be left reserved for future assignment (most of the Unicode® code space is unassigned), or given other designated functions.

A Unicode® text file is not necessarily merely a sequence of code points encoded into 4-byte blocks. Instead, an encoding scheme is used to serialize a sequence of code points into a sequence of bytes. A number of such encoding schemes exist, and these trade between space efficiency and ease of encoding. A variable number of bytes can be used for each character. For example, UTF-8 maintains some compatibility with ASCII. Encoding schemes also take into account endianness, which is the ordering of individually addressable sub-components within the representation of a larger data item as stored in external memory, such as big-endian and little-endian, and may have the property of being a self-synchronizing code, meaning character boundaries can be found without having to read from the beginning of the string.

SUMMARY

In one illustrative embodiment, a method, in a data processing system, is provided for improving search results. The illustrative embodiment analyzes a user query to identify a set of characters in the user query and an encoding code point associated with each character. The illustrative embodiment determines whether any of the encoding code points exist within an historic code point table. The illustrative embodiment retrieves all code points associated with each identified encoding code point in the user query from the historic code point table in response to at least one encoding code point existing within the historic code point table. The illustrative embodiment creates a modified user query that utilizes the encoding code points of the user query and the code points from the historic code point table. The illustrative embodiment then executes the modified user query.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an exemplary historic code point table in accordance with an illustrative embodiment;

DETAILED DESCRIPTION

As stated above, the Unicode code space is divided into seventeen planes (the basic multilingual plane and 16 supplementary planes), each with 65,536 ($=2^{16}$) code points. Thus the total size of the Unicode® code space is 17×65,536=1, 114,112. However, some code characters in some languages may have more than one code point historically defined in different versions of a code space, such as the Unicode® code space. That is, for example, the initial versions of the Unicode® code space did not cover all ideographic characters. Yet, the developers of the initial versions of the Unicode® code space provided a Private Use Area (PUA) that was reserved for vendors to define additional characters, for example, the area within U+F000 to U+F8FF and U+F0000 to U+FFFFD. Over time, some of these vendor defined characters have been promoted to official characters but with a different code point. For example, the Chinese, Japanese, Korean (cjk) unified ideograph " 圷 " is equivalent to U+E844 in Unicode® 4.0 but is also equivalent to U+4723 in Unicode® 4.1.

Again, search engines looks for the words or phrases exactly as entered and are based upon the current Unicode® code space with which the search engine is interpreting the characters of the entered words or phrases. For example, a search engine that interprets a query string in Unicode® 4.1, then the search engine searches for matches based on Unicode® 4.1. Thus, the search engine using the current encoding may not be able to find the documents that contain characters incompatible with a given encoding. As a solution to the deficiencies of such search engines, the illustrative embodiments provide a mechanism that enables a search engine to find documents that contain characters that were defined by one or more prior encodings and are incompatible with the given encoding. The illustrative embodiments construct a historic character code point table and use the table to identify multi-code point characters. Using the historic character code point table, the mechanism creates a new compound query that includes all the combinations of character code points of the original search query.

Figure 1:
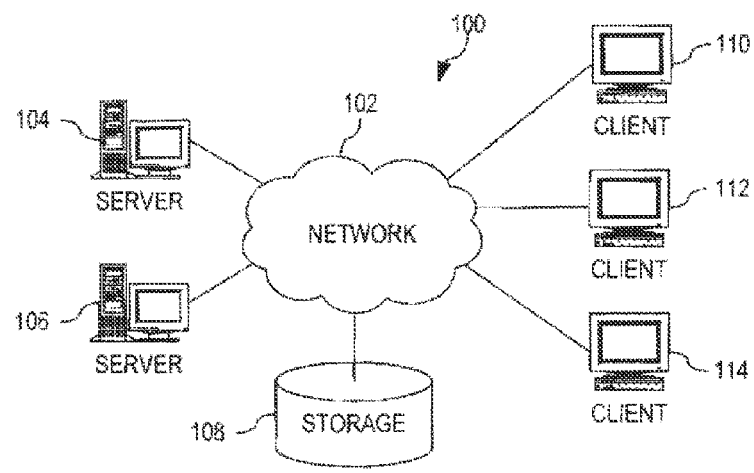
FIG. 1 is an example diagram of a distributed data processing system in which aspects of the illustrative embodiments may be implemented.
Figure 2:
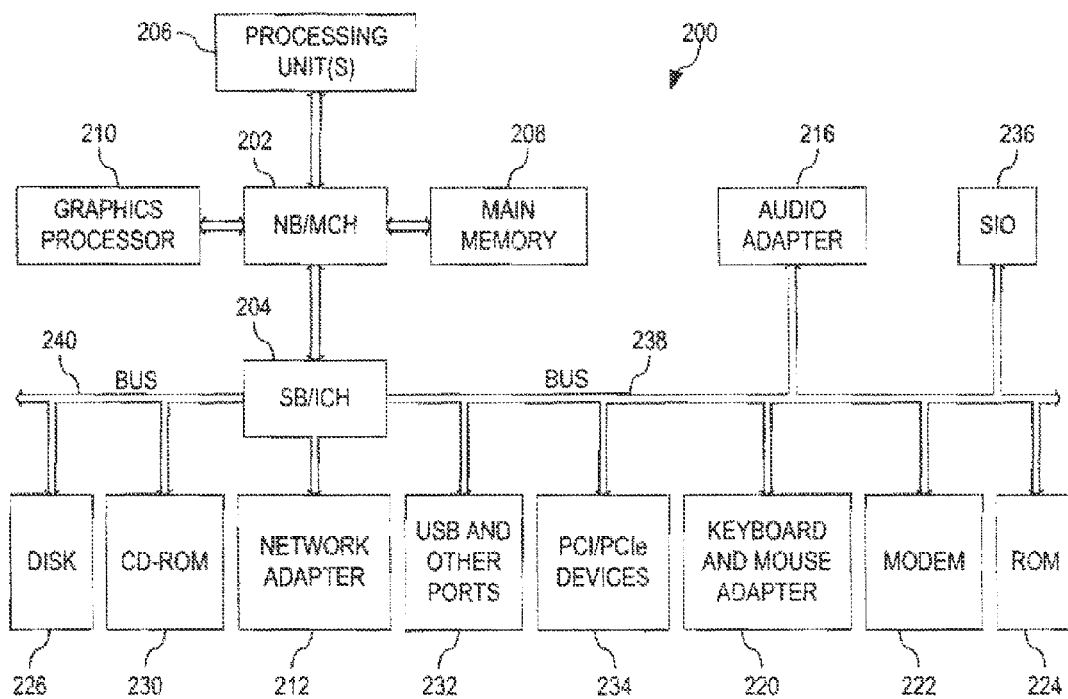
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. Distributed data processing system 100 contains at least one network 102, which is the medium used to provide communication links between various devices and computers connected together within distributed data processing system 100. Network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, the illustrative embodiments provide a mechanism that enables a search engine to find documents that contain characters incompatible with the given encoding. The illustrative embodiments construct a historic character code point table and use the table to identify multi-code point characters. Using the historic character code point table, the mechanism creates a new compound query that includes all the combinations of character code points of the original search query. A search engine then uses the new compound query to search documents that may contain incompatible characters in order to identify older documents that utilized the older incompatible characters.

Figure 3:
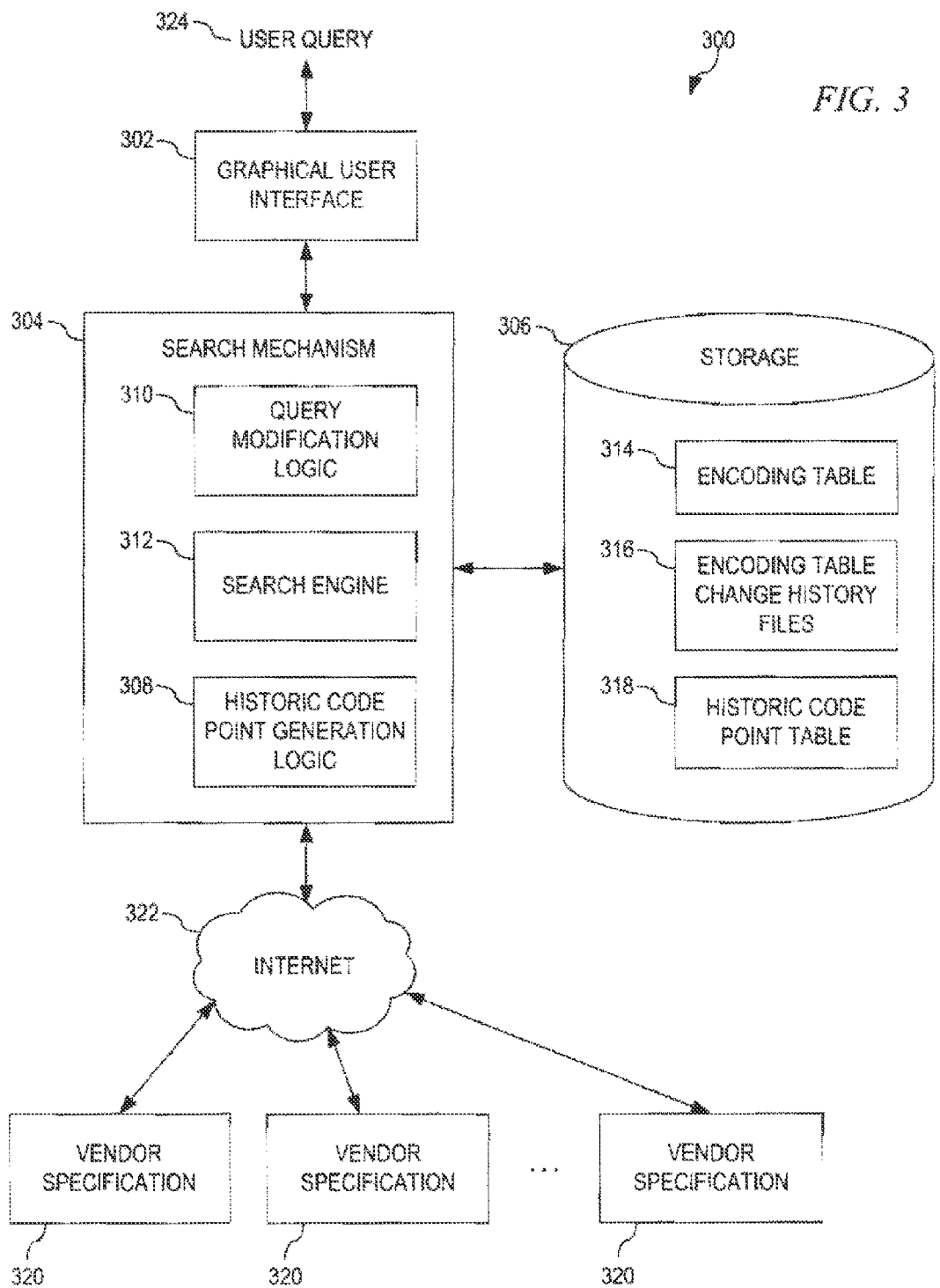
FIG. 3 depicts a functional block diagram of a search improvement mechanism in accordance with an illustrative embodiment.

FIG. 3 depicts a functional block diagram of a search improvement mechanism in accordance with an illustrative embodiment. Data processing system 300, which may be a data processing system such as data processing system 200 of FIG. 2, comprises graphical user interface (GUI) 302, search mechanism 304, and storage 306. Search mechanism 304 further comprises historic code point generation logic 308, query modification logic 310, and search engine 312. In order to construct a historic code point table for use in the illustrative embodiments, during initialization of search mechanism 304, historic code point generation logic 308 identifies the encoding associated with search engine 312. That is, search engines, such as search engine 312, are encoded with a given code space, such as being encoded with Unicode® 6.1. Based on the identified encoding, historic code point generation logic 308 identifies an associated encoding table 314 which may already be located within storage 306 or retrieved by historic code point generation logic 308 to storage 306 via the Internet 322.

For each character within encoding table 314, historic code point generation logic 308 determines when the character was promoted to an official character. This determination may be made by historic code point generation logic 308 analyzing encoding table change history files 316 associated with the current encoding table 314 as well as any previous versions of the encoding. However, in order to limit the time frame to which searches are performed, historic code point generation logic 308 may present the user with a list of the previous versions of encoding via GUI 302 so that the user may choose how far back future searches should go. For example, historic code point generation logic 308 may provide the user with a list comprising: Unicode® 6.1.0, Unicode® 6.0.0, Unicode® 5.2.0, Unicode® 5.1.0, Unicode® 5.0.0, Unicode® 4.1.0, Unicode® 4.0.1, Unicode® 4.0.0, Unicode® 3.2.0, Unicode® 3.1.1, Unicode® 3.1.0, Unicode® 3.0.1, Unicode® 3.0.0, Unicode® 2.1.9, Unicode® 2.1.8, Unicode® 2.1.5, Unicode® 2.1.2, Unicode® 2.1.0, Unicode® 2.0.0 along with their release dates. From the list the user may be able to select only the latest four or five encoding versions for which to improve search results, which in essence reduces the time for which future searches are performed. Generation logic 308 may also present the user with a list of vendors, operating system, and/or document processing software (e.g., MS Word) to further narrow down the search scope.

If historic code point generation logic 308 determines that encoding table change history files 316 indicates that the character was never promoted to an official character and, thus, is an original character, then historic code point generation logic 308 proceeds with the next character in encoding table 314. If historic code point generation logic 308 determines that encoding table change history files 316 indicates that the character was promoted to an official character, historic code point generation logic 308 adds the character and its associated encoding code point value to historic code point table 318. Historic code point generation logic 308 then searches one or more vendor specifications 320 for historic Private User Area (PUA) values that may be accessed via Internet 322. That is, historic code point generation logic 308 searches one or more vendor specifications 320, for example, the AIX® operating system vendor specification from IBM®, the Windows® operating system from Microsoft®, the LINUX® operating system from Oracle®, the OS X® operating system from Apple®, or the like. For characters that only exist in the PUA, character image matching may be used to determine the code points from different vendors. For example, for a PUA character defined by AIX®, an image recognition program or other method may take the image of the character from AIX® and compare with PUA characters defined by Oracle® Solaris one by one in order to find out the code point for the character in Oracle® Solaris.

If historic code point generation logic 308 identifies a historic PUA value from the one or more vendor specifications 320, then historic code point generation logic 308 adds the historic PUA value to historic code point table 318, with historic code point generation logic 308 proceeding with the next character in encoding table 314. If historic code point generation logic 308 fails to identify a historic PUA value from the one or more vendor specifications 320, then historic code point generation logic 308 proceeds with the next character in encoding table 314.

FIG. 4 depicts an exemplary historic code point table, such as historic code point table 318 created by historic code point generation logic 308, in accordance with an illustrative embodiment. As shown, historic code point table 400 comprises character column 402 and code point column 404. As illustrated Chinese, Japanese, Korean (cjk) unified ideograph "听" in character column 402 has equivalent code points U+E844 and U+4723. Chinese, Japanese, Korean (cjk) unified ideograph "鷹" in character column 402 has equivalent code points U+E862 and U+4D19. Chinese, Japanese, Korean (cjk) unified ideograph "鶏" in character column 402 has equivalent code points U+E85D and U+4D14. Chinese, Japanese, Korean (cjk) unified ideograph "饅" in character column 402 has equivalent code points U+E84F and U+4986. Chinese, Japanese, Korean (cjk) unified ideograph "馏" in character column 402 has equivalent code points U+E84E and U+4985.

Returning to FIG. 3, once historic code point generation logic 308 completes analysis of the characters in encoding table 314, historic code point generation logic 308 performs regular check as to whether the encoding associated with search engine 312 has changed. For instance, albeit known that software is regularly updated to newer versions, search engine 312 may be updated such that the encoded version may be updated to a newer version. Thus, only when the encoding of search engine 312 changes will historic code point generation logic 308 recheck all of the characters in encoding table 314.

However, once historic code point generation logic 308 generates historic code point table 318, search engine 312 may utilize historic code point table 318 for future queries. For example, when search mechanism 304 receives user query 324 via GUI 302, query modification logic 310 analyzes user query 324 to identify all of the characters in user query 324 and their associated encoding code point based on the current encoding of search engine 312. Based on their associated encoding code point, query modification logic 310 identifies whether any of the associated code points exist within historic code point table 318. If query modification logic 310 identifies that none of the associated code points exists within historic code point table 318, query modification logic 310 passes the user query 324 onto search engine 312 for execution. If query modification logic 310 identifies that at least one of the associated code points exists within historic code point table 318, query modification logic 310 retrieves all code points associated with each identified code point in user query 324 from historic code point table 318.

Query modification logic 310 then creates numerous code point sets for user query 324 that combines selected ones of the identified code points. For example, query modification logic 310 may identify three characters A, B, and C within user query 324 that have code points $A_1, A_2, B_1, B_2$, and $C_1, C_2$, and $C_3$, respectively, within historic code point table 318. Thus, query modification logic 310 creates twelve code point sets $\{A_1, B_1, C_1\}, \{A_1, B_1, C_2\}, \{A_1, B_1, C_3\}, \{A_1, B_2, C_1\}, \{A_1, B_2, C_2\}, \{A_1, B_2, C_3\}, \{A_2, B_1, C_1\}, \{A_2, B_1, C_2\}, \{A_2, B_1, C_3\}, \{A_2, B_2, C_1\}, \{A_2, B_2, C_2\},$ and $\{A_2, B_2, C_3\}$. Query modification logic 310 may then create twelve different search queries that each utilizes a different code point set or create one query that has substitutable variables where each of the variables are substituted with the identified code point from a code point set in turn on a subsequent execution of the query. Query modification logic 310 then works in conjunction with search engine 312 to execute each search query ensuring that each set of results identified by search engine 312 and presented in GUI 302 have an associated indicator indicating which code point was used in each query. Query modification logic 310 may use, for example, an OR operator to combine one or more of the search queries into one compound search query to execute if the search engine supports such operators.

Thus, search mechanism 304 enables a search engine to find documents that contain characters incompatible with the given encoding. Search mechanism 304 constructs a historic character code point table and uses the table to identify multi-code point characters. Using the historic character code point table, search mechanism 304 creates a new compound query that includes all the combinations of character code points of the original search query. Search engine 312 then uses the new compounded queries and/or substitution query to identify older documents that utilized the older incompatible characters.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
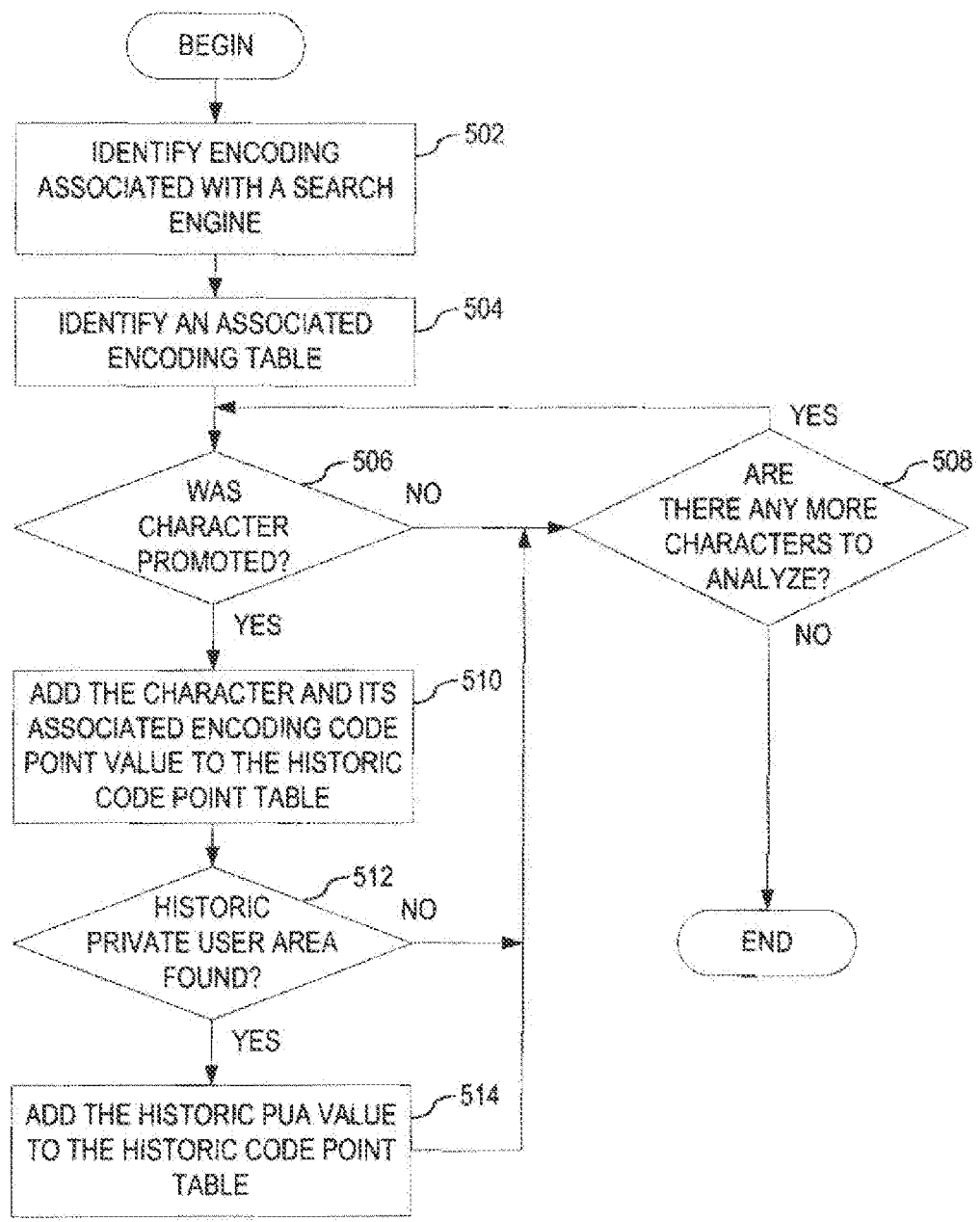
FIG. 5 depicts a flow diagram illustrating the operation performed in generating a historic code point table in accordance with an illustrative embodiment.

FIG. 5 depicts a flow diagram illustrating the operation performed in generating a historic code point table in accordance with an illustrative embodiment. As the operation begins, historic code point generation logic identifies the encoding associated with a search engine (step 502). Based on the identified encoding, the historic code point generation logic identifies an associated encoding table (step 504). For each character within the encoding table, the historic code point generation logic determines when the character was promoted to an official character (step 506). This determination may be made by the historic code point generation logic analyzing encoding table change history files associated with the current encoding table as well as any previous versions of the encoding.

If at step 506 the historic code point generation logic determines that the encoding table change history files indicates that the character was never promoted to an official character and, thus, is an original character, then the historic code point generation logic determines whether there are any more characters within the encoding table to analyze (step 508). If at step 508 there is at least one more character to analyze, then the operation proceeds to step 506. If at step 508 there are no more character to analyze, then the operation ends.

If at step 506 the historic code point generation logic determines that the encoding table change history files indicates that the character was promoted to an official character, the historic code point generation logic adds the character and its associated encoding code point value to the historic code point table (step 510). The historic code point generation logic then searches one or more vendor specifications for historic Private User Area (PUA) values (step 512). If at step 512 the historic code point generation logic identifies a historic PUA value from the one or more vendor specifications, then the historic code point generation logic adds the historic PUA value to the historic code point table (step 514), with the operation returning to step 508 thereafter. If at step 512 the historic code point generation logic fails to identify a historic PUA value from the one or more vendor specifications, then the operation returns to step 508.

Figure 6:
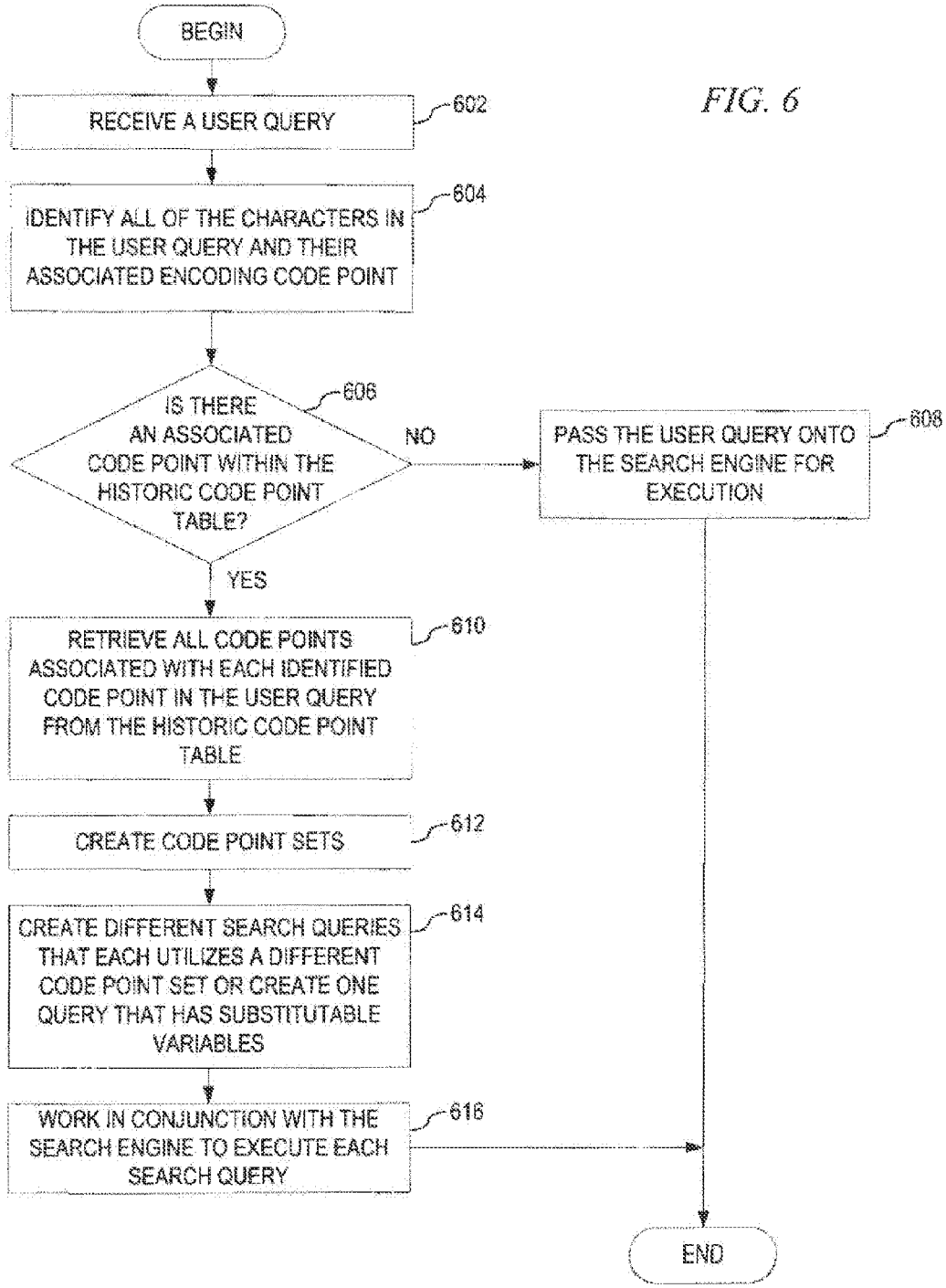
FIG. 6 depicts a flow diagram illustrating the operation performed by a search improvement mechanism using a historic code point table in accordance with an illustrative embodiment.

FIG. 6 depicts a flow diagram illustrating the operation performed by a search improvement mechanism using a historic code point table in accordance with an illustrative embodiment. As the operation begins, a search mechanism receives a user query (step 602). Query modification logic analyzes the user query to identify all of the characters in the user query and their associated encoding code point based on the current encoding of the search engine (step 604). Based on their associated encoding code point, the query modification logic identifies whether any of the associated code points exist within the historic code point table (step 606). If at step 606 the query modification logic identifies that none of the associated code points exists within the historic code point table, the query modification logic passes the user query onto the search engine for execution (step 608), with the operation ending thereafter. If at step 606 the query modification logic identifies that at least one of the associated code points exists within the historic code point table, the query modification logic retrieves all code points associated with each identified code point in the user query from the historic code point table (step 610).

The query modification logic then creates numerous code point sets for the user query that combines selected one of the identified code points (step 612). The query modification logic may then either create different search queries that each utilizes a different code point set or create one query that has substitutable variables where each of the variables are substituted with the identified code point(s) from a code point set in turn (step 614). The query modification logic then works in conjunction with the search engine to execute each search query (step 616) ensuring that each set of results identified by the search engine have an associated indicator indicating which code point was used in each query, with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a mechanism that enables a search engine to find documents that contain characters incompatible with the given encoding. The illustrative embodiments construct a historic character code point table and use the table to identify multi-code point characters. Using the historic character code point table, the mechanism creates a new compound query that includes all the combinations of character code points of the original search query. A search engine then uses the new compound query and substitutes incompatible characters for compatible characters in order to identify older documents that utilized the older incompatible characters.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improving search results, the method comprising:
   analyzing, by a processor, a user query to identify a set of characters in the user query and an encoding code point associated with each character;
   determining, by a processor, whether any of the encoding code points exist within a historic code point table, wherein the historic code point table is generated by the method comprising:
      identifying by processor, an encoding associated with a search engine;
      based on the identified encoding, identifying, by a processor, an associated encoding table;
      for each character within the encoding table, determining, by a processor, when the character was promoted to an official character;
      responsive to identifying that the character was promoted to an official character, adding, by a processor, the character to the historic code point table;
      adding by a processor, an encoding code point value associated with the character to the historic code point table;
      identifying, by a processor, at least one historic private user area value; and
      adding, by a processor, the at least one historic private user area value to the historic code point table;
   responsive to at least one encoding code point existing within the historic code point table, retrieving, by a processor, all code points associated with each identified encoding code point in the user query from the historic code point table;
   creating, by a processor, a modified user query that utilizes the encoding code points of the user query and the code points from the historic code point table; and
   executing, by a processor, the modified user query.

2. The method of claim 1, wherein the modified user query is a set of modified user queries that each utilizes a different code point set from a set of different code point sets.

3. The method of claim 1, wherein the modified user query is a query that utilizes variables that can be substituted and wherein each of the variables are substituted in turn with a different code point set from a set of different code point sets.

4. The method of claim 1, further comprising:
   responsive to none of the encoding code points existing within the historic code point table the query modification logic, passing, by a processor, the user query to the search engine for execution.

5. The method of claim 1, wherein the encoding code point associated with each character is based on a current encoding of a search engine that executes the query.

6. The method of claim 1, further comprising:
   responsive to identifying that the character was not promoted to the official character, not adding, by a processor, the character or the encoding code point value associated with the character to the historic code point table.

7. A computer program product comprising a non-transitory computer readable storage medium having a computer readable program stored therein, wherein the computer readable program, when executed on a computing device, causes the computing device to:

analyze a user query to identify a set of characters in the user query and an encoding code point associated with each character;

determine whether any of the encoding code points exist within a historic code point table, wherein the historic code point table is generated by the computer readable program causing the computing device to:

identify, an encoding associated with a search engine;

based on the identified encoding, identify an associated encoding table;

for each character within the encoding table, determine when the character was promoted to an official character;

responsive to identifying that the character was promoted to an official character, add the character to the historic code point table;

add a code point value associated with the character to the historic code point table;

identify at least one historic private user area value; and add the at least one historic private user area value to the historic code point table;

responsive to at least one encoding code point existing within the historic code point table, retrieve all code points associated with each identified encoding code point in the user query from the historic code point table;

create a modified user query that utilizes the encoding code points of the user query and the code points from the historic code point table; and execute the modified user query.

8. The computer program product of claim 7, wherein the modified user query is a set of modified user queries that each utilizes a different code point set from a set of different code point sets.

9. The computer program product of claim 7, wherein the modified user query is a query that utilizes variables that can be substituted and wherein each of the variables are substituted in turn with a different code point set from a set of different code point sets.

10. The computer program product of claim 7, wherein the computer readable program further causes the computing device to:

responsive to none of the encoding code points existing within the historic code point table the query modification logic, pass the user query to the search engine for execution.

11. The computer program product of claim 7, wherein the encoding code point associated with each character is based on a current encoding of a search engine that executes the query.

12. The computer program product of claim 7, wherein the computer readable program further causes the computing device to:

responsive to identifying that the character was not promoted to the official character, not add the character or the encoding code point value associated with the character to the historic code point table.

13. An apparatus, comprising:

a processor; and a memory coupled to the processor, wherein the memory comprises instructions which, when executed by the processor, cause the processor to:

analyze a user query to identify a set of characters in the user query and an encoding code point associated with each character;

determine whether any of the encoding code points exist within a historic code point table wherein the historic code mint table is generated by the instructions further causing the processor to:

identify an encoding associated with a search engine;

based on the identified encoding, identify an associated encoding table;

for each character within the encoding table, determine when the character was promoted to an official character;

responsive to identifying that the character was promoted to an official character, add the character to the historic code point table;

add an encoding code point value associated with the character to the historic code point table;

identify at least one historic private user area value; and add the at least one historic private user area value to the historic code point table;

responsive to at least one encoding code point existing within the historic code point table, retrieve all code points associated with each identified encoding code point in the user query from the historic code point table;

create a modified user query that utilizes the encoding code points of the user query and the code points from the historic code point table; and execute the modified user query.

14. The apparatus of claim 13, wherein the modified user query is a set of modified user queries that each utilizes a different code point set from a set of different code point sets.

15. The apparatus of claim 13, wherein the modified user query is a query that utilizes variables that can be substituted and wherein each of the variables are substituted in turn with a different code point set from a set of different code point sets.

16. The apparatus of claim 13, wherein the instructions further cause the processor to:

responsive to none of the encoding code points existing within the historic code point table the query modification logic, pass the user query to the search engine for execution.

17. The apparatus of claim 13, wherein the encoding code point associated with each character is based on a current encoding of a search engine that executes the query.

18. The apparatus of claim 13, wherein the instructions further cause the processor to:

responsive to identifying that the character was not promoted to the official character, not add the character or the encoding code point value associated with the character to the historic code point table.

\* \* \* \* \*